Feb. 28, 1933.  O. U. ZERK  1,899,071
LUBRICATING APPARATUS
Filed Dec. 9, 1929
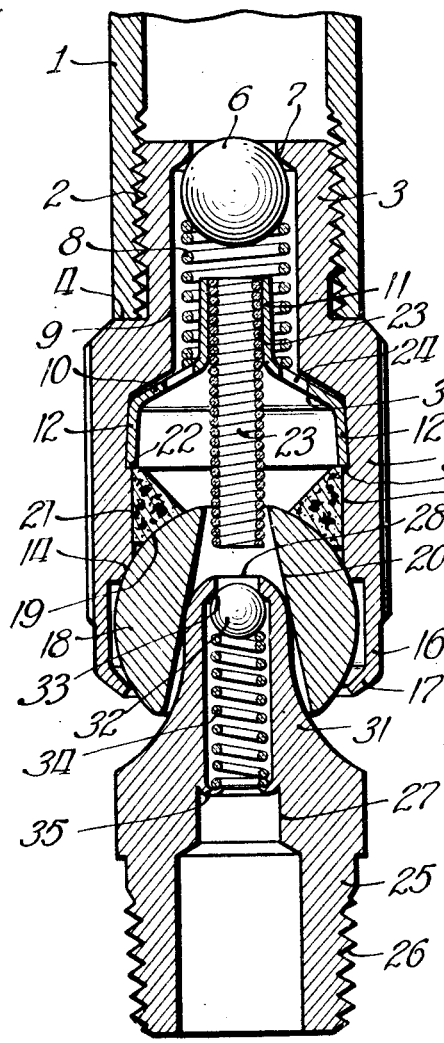
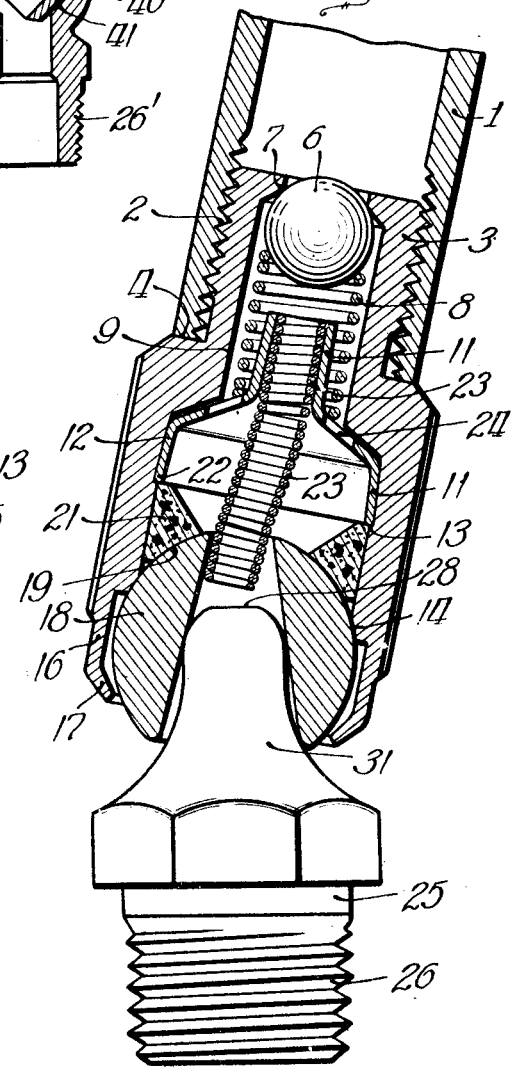
Inventor
Oscar U. Zerk Patented Feb. 28, 1933

1,899,071

UNITED STATES PATENT OFFICE

OSCAR U. ZERK, OF CHICAGO, ILLINOIS, ASSIGNOR TO ALEMITE CORPORATION, OF CHICAGO, ILLINOIS, A CORPORATION OF DELAWARE

LUBRICATING APPARATUS

Application filed December 9, 1929. Serial No. 412,619.

This invention relates to grease guns for lubrication purposes and particularly to grease guns of the class employing nozzles and nipples of the contact type.

In my copending application, Serial Number 396,352, filed September 30, 1929 (case 11) I show and describe a grease gun provided with a nozzle and adapted to coordinate with a nipple, the nozzle and nipple being generally of the contact type. The subject matter of the instant application relates to nozzles and nipples of this general class.

When the lubricant gun is used and the nozzle is presented to the nipple to engage the same under contact pressure it is highly desirable that the nozzle will engage the nipple with a sealing pressure contact with the gun at an angle to the nipple in order that the parts of the gun may not come into contact with other parts of the machine, vehicle, etc., or the bearing thereof which is to be lubricated.

Various means have been proposed by which this may be accomplished. Among others, the nozzle on the end of the grease gun has been provided with a ball and socket universal joint construction permitting universal movement of the gun and nozzle relative to the nipple or of the gun proper relative to the nozzle.

However, due to the fact that the ball and socket contact area of these constructions is generally great in comparison with the mutually engaged contact portions of the nozzle and nipple, and that clearance or play must be allowed between the spherical surfaces of the joint to permit free movement thereof, a great amount of leakage occurs through the ball and socket joint.

Furthermore, in ball and socket joints as heretofore proposed for this purpose, after the gun has been used on one occasion at an angle to the nipple, the ball and socket joint will remain in an angular position, that is, the nozzle will not return to its central position in alignment with the gun, so that upon the next application of the nozzle to a nipple, it may be inconvenient to suitably engage the nozzle with the nipple.

Again, in prior constructions, it has been found desirable to cause the nipple to engage the nozzle along a relatively sharp or thin contact edge on the nipple and this has made the nipple sensitive to mutilation from accidental impacts and blows to which it is always exposed when not actually engaged by the nozzle.

It is, therefore, one of the objects of this invention to provide in a grease gun a ball and socket joint construction for the nozzle in which leakage of lubricant through the ball and socket surfaces is prevented and without interfering with the free universal movement of the joint.

Another object is to provide a universally movable nozzle joint construction which will automatically return to substantially a central or neutral position in alignment with the gun proper after each application of the nozzle to a nipple.

Another object of my invention is to provide a grease gun having a universal joint for the nozzle and in which the nozzle is rendered self-centering by a resilient tubular portion of the grease conducting conduit through the nozzle.

Another object is to provide a self-centering universally movable nozzle of the class described in which the resilient tubular element may be a closely wound helical spring normally co-axial with the lubricant conducting passageway through the nozzle.

Another object is to provide a ball and socket universal joint nozzle construction having improved means for sealing the joint between the ball and socket portions of the joint.

Another object is to provide in a grease gun nozzle and nipple construction, having a ball and socket joint for the nozzle, improved means whereby upon movement of the gun beyond a predetermined angular position relative to the nipple it will automatically disengage the nozzle from the nipple to prevent movement in the ball and socket joint beyond a predetermined angular amount.

Another object is to provide in a nipple and nozzle construction of the general type in which the nipple is engaged with the nozzle on a female portion of the nozzle, a nipple having a corresponding contact portion formed to resist accidental mutilation.

Another object is to provide in a nozzle and nipple construction of the type in which a female portion of the nozzle is engaged by a male portion of the nipple along a pressure contact edge, an improved form of nipple which will facilitate engagement thereof with the nozzle.

Another object is to provide in a nipple and nozzle construction of the type in which a male nipple engages a female nozzle along a line of pressure contact, an improved nipple construction whereby the nipple is sealed against back flow of the lubricant out of the nipple and against the entrance of dust, dirt, moisture and other foreign substances into the nipple.

Other objects of my invention and the invention itself will be better understood by reference to the following description of an embodiment of my invention illustrated in the accompanying drawing and which are referred to in said description.

In the drawing:—

Fig. 1 is a longitudinal sectional view of a grease gun nozzle and nipple in which my invention is embodied.

Fig. 2 is a view similar to Fig. 1 showing certain portions thereof in different operative positions.

Fig. 3 is a fragmentary view similar to Fig. 1 showing my invention in connection with a modified form of nipple.

Referring now to the drawing, at 1 I show the tubular discharge end of a lubricant compressor, such as a grease gun, from which and by means of which lubricant under pressure may be forced by manual effort exerted against the posterior end thereof.

A discharge nose for the compressor is screw threaded at 2 into the end 1 thereof, engageable by a shoulder 4 with the end thereof.

A lubricant passage 9 extends axially entirely through the nose 5. At the upper end of the nose 5 as viewed in the drawing the passage is sealed by a ball type check valve 6, resiliently engaged with an annular valve seat 7, the ball being held on the seat by a helical compression spring 8 extending axially downwards through the passage 9 and abutting at its upper end upon the ball 6 and at its lower end upon the inclined wall 36 of an inverted cup-shaped element 10, having a reduced tubular stem 11 which extends into an end of the spring 8.

The spring 8 thus exerts axially directed force against the cup element 10 and the latter is retained against longitudinal movement by a shoulder 13 in the passage 9 upon which the open annular edge of the enlarged portion 12 of the cup abuts.

Below the cup-shaped element the conduit wall is formed to provide a seat or socket 14 for a parti-spherical element 18. Between the socket 14 and the shoulder 13 the passageway extends by a preferably cylindrical portion 15. Beyond the socket 14 the nose 5 has a relatively thin depending wall or skirt 16, the lower terminating edge of which is bent inwardly as at 17 to provide a retaining means for the boxed nozzle 18.

The convexly spherical surface 19 of the nozzle 18 substantially fits the concavely parti-spherical surface 14 of the nose 5. The bore of the nozzle flares outwardly, being preferably of frustro-conical form, and communicates with the passage 9.

Between the lower edge of the element 10 and the spherical surface 19 of the nozzle, an annular packing 21 is sealingly engaging the said surface 19 and the inner cylindrical surface 15 of the nose 5 and is engaged at 22 by the lower edge of the element 10.

A tightly wound helical spring 23 is fitted tightly into the reduced tubular end 11 of the element 10 and projects through the large end thereof through the annular packing 21 and for a suitable distance into the upper end of the tapering passageway 20 in the nozzle 18.

The element 10 is preferably provided with a plurality of perforations 24 in an intermediate sloping wall 36 thereof.

The compressor nozzle mechanism above described is illustrated in the drawing in association with a nipple 25, having a threaded tubular stem 26, by which it may be screwed into a bearing element to be lubricated.

The nipple is provided with a longitudinal bore 27, and its upper end is of tapered form, to form a lubricant receiving tip of such a size to adapt it to be readily received into the frustro-conical bore 20, of the nozzle 18.

The end 30 of the nipple tip is so rounded as to engage the wall of the nozzle passageway 20 on an annular line or zone of contact indicated at 29, which is spaced from its end.

The intermediate waist of the nipple is enlarged and of preferably hexagonal form for engagement by a wrench. Intermediate the point 29 and the waist the nipple is longitudinally concaved so as to be free of contact with that portion of the nozzle passage 20 between the point of contact 29 and its outer end edge.

A sealing line of pressure contact at the point or zone 29 between the nipple and the nozzle is thus accomplished by a relatively blunt smoothly rounded knob-like nipple tip, and contact surface of the nipple thus provided, is of such form that it will not be easily damaged or mutilated or rendered unfit for making sealing contact with the contact surface of the nozzle comprising the inner surface of its bore.

The upper end of the nipple bore is provided with a ball check valve 32 engageable with an annular valve seat 33 in the conduit 27 and a compression spring 24 is disposed in the passage, in compression between the ball 32, and an inwardly extending annular flange 35 of the bore walls.

In the operation of the embodiment of my invention, shown in Figs. 1 and 2. it will be understood that the nipple 25 is one of a number of similar nipples which may be attached to the various bearings to be lubricated. To forcibly inject lubricant to a bearing through its associated nipple such as 25, the grease gun provided with the nose 5 is presented to the nipple, to cause the end 30 of the nipple to be received within the passage 20 of the nozzle 18.

At the time of so presenting the gun, the nozzle 18 will always normally be positioned with the axis of the recess 20 coaxial with the gun by the retractive action of the resilient conduit or spring 23. It will be observed that the spring 23 is normally straight, and thus, whenever the nozzle piece 18 is out of engagement with a nipple, the spring 24 will be free to resume its straight form and will return the nozzle 18 from any oscillated position it may have taken to the symmetrical position in alignment with the nose 5.

When the end 30 of the nipple is received into the recess passage 20. it is guided thereinto by the knob or rounded shape of the extreme end thereof. By applying pressure to the gun towards the nipple, sealing contact engagement is made along the annular line or zone 29 of contact between the nipple and the wall of the passageway 20. For convenience, and to render the operation of the gun efficient, the gun may be rocked through an angle out of line with the nipple to clear the gun from portions of the machine, vehicle, etc., to which the nipple 25 may be attached. When the gun is so-rocked, the nose 5 will rock around the nozzle piece 18 on the ball and socket surfaces 14 and 19 above described.

As it so rocks, the packing element 21 maintains its sealing contact with the spherical surface 19. Also, the spring 23 will be resiliently bent laterally out of its straight line condition and parts thus operated will assume the position shown in Fig. 2.

Pressure of the nozzle 18 upon the end of the nipple 25 will cause the nozzle 18 to be intimately seated in the socket 14 to facilitate the oscillatory adjustment of the gun to its desired angular position.

The gun may now be operated to force lubricant through the nose 5 and the lubricant under pressure will force the valve 6 from its seat and permit lubricant to flow axially through the spring 23 and also through apertures 24, and thence into the nozzle bore 20. The bore of the nozzle being in sealed communication with that of the nipple, the lubricant will forcibly lift the valve 32 and will be forced downwardly through the conduit 27 of the nipple.

Upon removing the gun and removing the nozzle piece 18 from the nipple, the spring 23 will rock the nozzle piece 18 from the position shown in Fig. 2 to that shown in Fig. 1, thus restoring it to its central position preparatory for the next operation.

By providing the nipple with the rounded end 30, I not only improve and simplify the operation of engaging the nozzle piece 18 with the nipple, as above described, but also provide room in the nipple adjacent its end for the ball check valve construction described and provide room for the valve seat 33 thereof to be positioned near the end 28 of the conduit therein.

If, in oscillating the gun to an angular position relative to the nipple, it is oscillated beyond a predetermined amount, the extreme lower end edge 17 of the nose 5 will come into engagement with the nipple and the nose will rock upon its end and cause the nozzle 18 to move outwardly from the nipple and to be withdrawn from and be disengaged from the nipple. This disengagement, upon oscillating the gun beyond the desired limited angle, will occur before the spring 23 has been bent laterally far enough to engage and mutilate the packing 21, thus automatically protecting the same from injury.

In assembling the element 10 into the nose piece 5, I preferably form it with an outside diameter at its large end slightly smaller than the diameter of walls of the nose bore, and insert the same into the conduit through the lower end of the nose 5 as positioned in the drawing. Thereafter, by means of a suitably expanding tool, the skirt 11 may be outwardly expanded to cause the edge of the skirt to overlap the shoulder 13 to retain the element 10 in the bore of the nose against the pressure of the spring 8, as above described.

In Fig. 3, I have shown my invention as employed in connection with a nipple of the elbow type. The construction is substantially the same as that shown in Figs. 1 and 2, except that the nipple, instead of being formed all in one piece, has the contacting portion 40 thereof formed separately and provided with a generally cylindrical portion 41 press-fitted into a corresponding cylindrical bore in a main nipple body 42 upon which threads 26 are formed. From the preceding description of the straight type nipple, the operation of the elbow type in Fig. 3 will be readily understood.

Having thus described my invention, I am aware that numerous and extensive departures may be made from the embodiment thereof herein illustrated and described, but without departing from the spirit of my invention.

I claim:

1. In a lubricating gun discharge nozzle, a nose provided with a spherically shaped socket, a nozzle piece having a convex spherical portion universally oscillatable in the socket, a lubricant conduit through the nose and nozzle piece, a sealing element for the socket joint provided with a concave spherical surface engaging the said spherical portion, and resilient means to hold the lubricant conduit through said nose in alignment with the conduit through the nozzle piece.

2. In a lubricating gun discharge nozzle, a nose provided with a spherically shaped socket, a nozzle piece having a convex spherical portion universally oscillatable in the socket, a lubricant conduit through the nose and nozzle piece, said socket including a portion of compressible packing material sealably engaging a wall of the conduit, and a spring to hold the nose and nozzle piece in alignment.

3. In a lubricant gun discharge nozzle, a nose, a nozzle piece having universal joint connection therewith, and provided with a lubricant passage, and a spring associated axially with the nose to centrally align the nozzle piece and having a free end projecting into the passage.

4. In a lubricant gun discharge nozzle, a nose, a nozzle piece having universal joint connection therewith, and provided with a lubricant passage and a spring having one end secured axially in the nose and having its other end extending into the passage way to centrally align the nozzle piece.

5. In a lubricant gun discharge nozzle, a nose, a nozzle piece having universal joint connection therewith, and provided with a lubricant passage and a helical spring associated with the nose to conduct lubricant to the passage way and to centrally align the nozzle piece.

6. In a lubricant gun discharge nozzle, a nose, a nozzle piece having universal joint connection therewith and provided with a lubricant passage and a helical spring for conducting lubricant to the passage, said spring having one end secured axially in the nose and having its free end extending into the passage way to centrally align the nozzle piece.

7. In a lubricant gun discharge nozzle, a bored nose, a bored spherical nozzle universally oscillatable in a socket of the nose, a cup-shaped element in the nose bore, a packing element making sealing engagement with the spherical surface of the nozzle and the conduit wall, and a helical spring secured to the cup bottom extending longitudinally through the cup into the nozzle bore.

8. In a lubricant gun discharge nozzle, a nose, a conduit through the nose, a socket in the conduit, a spherical nozzle piece universally oscillatable in the socket and provided with a passageway therethrough, a cup-shaped element in the conduit, a packing element sealably engaging the spherical surface of the nozzle piece, and the conduit wall, and retained by the open annular edge of the cup-shaped element, a helical spring secured to the cup bottom extending axially through the conduit into the passageway, and a check valve for the nose and a compression spring extending from the valve to the said cup bottom.

In testimony whereof I hereunto affix my signature this 7 day of December, 1929.

OSCAR U. ZERK.